United States Patent
Kim et al.

(10) Patent No.: US 7,083,336 B2
(45) Date of Patent: Aug. 1, 2006

(54) OPTICAL MODULE WITH LATCHING/DELATCHING MECHANISM

(75) Inventors: Brian H. Kim, Fremont, CA (US); William H. Wang, Pleasanton, CA (US)

(73) Assignee: Intel Corporation, Santa Clara, CA (US)

( * ) Notice: Subject to any disclaimer, the term of this patent is extended or adjusted under 35 U.S.C. 154(b) by 86 days.

(21) Appl. No.: 10/803,424

(22) Filed: Mar. 18, 2004

(65) Prior Publication Data

US 2005/0196109 A1   Sep. 8, 2005

Related U.S. Application Data

(60) Provisional application No. 60/550,554, filed on Mar. 3, 2004, provisional application No. 60/549,861, filed on Mar. 2, 2004.

(51) Int. Cl.
*G02B 6/36* (2006.01)

(52) U.S. Cl. ............................ 385/92; 385/88; 439/607

(58) Field of Classification Search ............ 385/88–94; 439/607

See application file for complete search history.

(56) References Cited

U.S. PATENT DOCUMENTS

| | | | |
|---|---|---|---|
| 6,439,918 B1 | 8/2002 | Togami et al. | 439/372 |
| 6,533,603 B1 | 3/2003 | Togami | 439/372 |

2003/0228799 A1 * 12/2003 Machado et al. ........... 439/607

OTHER PUBLICATIONS

International Search Report issued in PCT/US05/004479 mailed on May 6, 2005.
Written Opinion issued in PCT/US05/004479 mailed on May 6. 2005.
Cooperation Agreement for Small Form-Factor Pluggable Transceivers, pp. 1-38 (2000).
Intel Press Release—"Intel Cost-Effectively Doubles Performance of Today's Fibre Channel Storage Systems to Enable Emerging Applications," [online] (2 pages) (Projected Publication Feb. 9, 2004).

* cited by examiner

*Primary Examiner*—Phan Palmer
(74) *Attorney, Agent, or Firm*—Marshall, Gerstein, Borun LLP

(57) ABSTRACT

An optical module that may be used in small-form factor pluggable applications includes a delatching/latching mechanism. The optical module may be an optical transceiver, for example, and the delatching/latching mechanism may allow for improved insertion and removal of the optical module from a cage in a computer board assembly. A latching assembly that assists in latching and delatching may include a latching member having a slotted mating element that is in contact with, and rotates relative to a substantially-fixed pivot element. Rotation may be achieved via a rotatable actuator having a cam engaging a cam follower. Numerous example biasing apparatuses are described to bias the latching assembly to its latched position and to promote contact between the mating element and the pivot element.

29 Claims, 15 Drawing Sheets

OPTICAL MODULE WITH LATCHING/DELATCHING MECHANISM

CROSS-REFERENCE TO RELATED APPLICATIONS

This application claims the benefit of U.S. Provisional Application No. 60/549,861, filed on Mar. 2, 2004 entitled "Optical Module with Delatching Mechanism," the entire application of which is hereby expressly incorporated herein by reference. This application claims the benefit of U.S. Provisional Application No. 60/550,554, filed on Mar. 3, 2004 entitled "Optical Module with Delatching Mechanism," the entire application of which is hereby expressly incorporated herein by reference.

FIELD OF THE DISCLOSURE

The present disclosure relates generally to optical modules and, more specifically, to optical modules removably mountable within a cage or housing.

BACKGROUND OF RELATED ART

The promulgation of optical networks has been integral to the advancement of information technology. From local-, wide-, and metro-area networks to cable television networks, optical networks have brought increased services and information access to consumers. Optical networks offer the high-bandwidth needed for high-volume usage and data intensive content, such has high quality video and audio.

These optical networks commonly rely upon an optical fiber backbone, with optical repeaters, amplifiers and transceivers coupled across the backbone to send and receive optical signals. Switches and routers, for example, use transceivers to control data dissemination and collection in various network environments, such as an Ethernet-based networks and larger Internet Service Provider (ISP) networks. Host bus adaptors (HBA), redundant-array-of-independent-disks (RAID) modules, Fibre Channel devices and other technologies use optical networks in computing environments to connect storage systems and processors for high-bandwidth high-interconnectivity communication between computer systems.

As networks become more diverse in type and more complex in operation, more optical components are needed. Network designers are often called upon to build complex systems using equipment from many different vendors. Yet, while the availability of competing products may be useful this availability has led to a lack of device uniformity. A network designer is cautious when selecting an optical module, because modules may or may not accurately fit the network device's mounting cage, depending on the relative dimensions of the two.

Some vendors have implemented standards for optical transceivers to help reduce variability issues. For example, a manufacturer may design small form-factor pluggable transceivers (SFPs) compatible with standards from the Small Form Factor Pluggable (SFP) Multi-Source Agreement (MSA) standard (SFP/MSA). This standard may be used for optical systems such as asynchronous transfer mode (ATM), fiber-distributed data interface (FDDI), Fibre Channel, Fast Ethernet and Gigabit Ethernet, and Synchronous Optical Network (SONET)/Synchronous Digital Hierarchy (SDH) applications. The MSA agreements cover package dimension, connector system design, host board layout, and electrical interfaces, among other things. The agreements evidence guidelines, however.

Even with the SFP/MSA, there is still variability among network device manufacturers. As a result, transceiver manufactures still run the risk of producing equipment incompatible with a particular network device. Yet, proper optical module engagement may be important to longevity. Improperly fitting modules also run the risk of alienating network administrators and designers, who are reluctant to reuse optical modules that do not form a 'good' fit in previously-installed devices. The various latching tolerances on present and past cage designs has been particularly problematic for optical transceivers, as customers typically want an optical module they can easily insert and remove.

Some latching mechanisms have been proposed for optical devices, but the designs are problematic in that they do not form tight seals and can degrade in performance or completely malfunction over time. For example, designs often rely upon movable parts that do not have sufficient engagement or which can break under normal operation forces by their use of inferior construction materials or inferior locking configurations.

DETAILED DESCRIPTION OF AN EXAMPLE

Numerous examples are provided of latching mechanisms that may be selectively latched and delatched with a casing. The examples may be used with, and are described in relation to, an optical module that may be plugged into a cage. Although example optical modules are described, such as small form factor pluggable (SFP) optical transceivers, the present disclosure is not limited to such example devices. Furthermore, while some example implantations are illustrated, persons of ordinary skill in the art will appreciate that other implementations may be used and, thus, fall within the present teachings.

Figure 1:
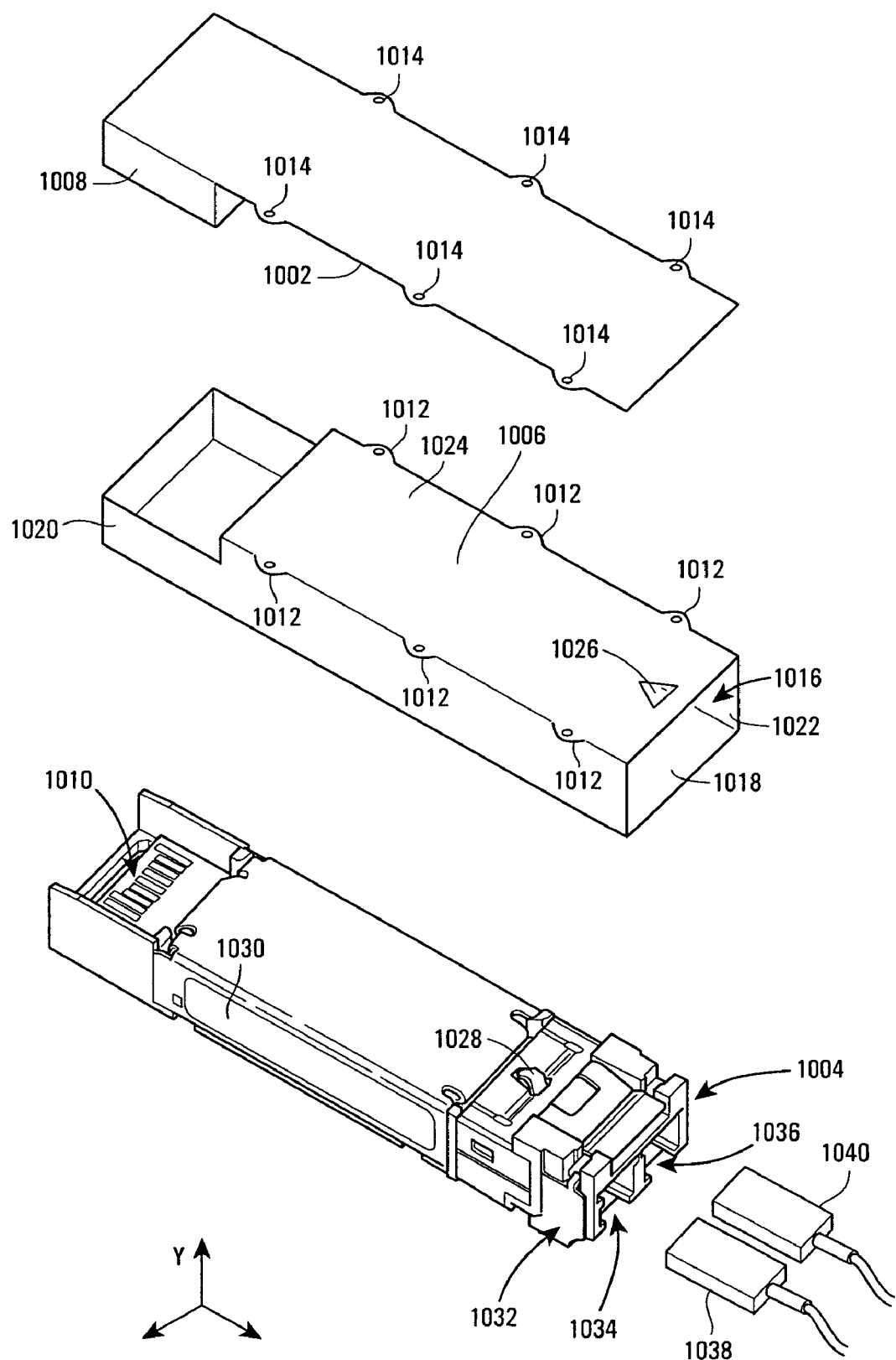
FIG. 1 illustrates an unassembled computer board assembly showing a host board, optical module, and cage, in accordance with an example.

FIG. 1 illustrates an unassembled computer board assembly 1000 that includes a host board 1002, an optical module 1004, and a cage 1006. The assembly 1000 may be part of processor-based system, such as a switch, router, server, or personal computer. Example standards for such system devices include asynchronous transfer mode (ATM), fiber-distributed data interface (FDDI), Fibre Channel, Fast Ethernet and Gigabit Ethernet, and Synchronous Optical Network (SONET)/Synchronous Digital Hierarchy (SDH) standards.

The host board 1002 may be interfaceable with a microprocessor (not shown). For example, the host board 1002 may be part of a motherboard or the host board 1002 may be pluggable into an expansion slot (not shown) coupled thereto. To interface with the optical module 1004, the host board 1002 may include a connector 1008 that couples to an edge connector 1010 on the optical module 1004. Although, not shown, it will be understood by persons of ordinary skill in the art that the optical module 1004 may house a printed circuit board (PCB) that includes the edge connector 1010. The PCB may include controller circuitry, such as the control circuit for an optical transceiver, including a microprocessor, in communication with pins on the edge connector 1010, if the optical module 1004 is an optical transceiver. Alternatively, the PCB may include other control circuitry if the optical module 1004 is another optical device. The optical module 1004 is not limited to a specific optical device.

The cage 1006 may be mountable to the host board 1002 via an adhesive, solder, latch, fastener, press-fit or other mounting. In the illustrated example, the cage 1006 has a plurality of slots 1012 that align with a plurality of holes 1014 in the host board 1002 for screw mounting of the two. The cage 1006 may be formed of a metal such as aluminum, steel, and stainless steel and may have dimensions compliant with the Small Form Factor Pluggable (SFP) Multi-Source Agreement (MSA) standard (SFP/MSA). The optical module may be pluggable into a slot 1016 of the cage 1006 defined by walls 1018, 1020, 1022, and 1024. Wall 1024 includes a latching recess 1026 for accepting and locking onto a retractable latch 1028 of the optical module 1004. The retractable latch 1028 is part of a latching mechanism (shown in greater detail in FIG. 2) that may be used to selectively latch and delatch the optical module 1004 to and from the cage 1006. In the illustrated configuration, the optical module 1004 may be latched and delatched from cages of different sizes. For example, the amount of extension of the latch 1028 above a top surface 1030 of the optical module 1004 may provide greater latching range. A larger latch 1028 may be able to engage a cage of larger dimension, as measured along the y-axis.

The optical module 1004 may be any pluggable module, for example, an optical transceiver compliant with the SFP/MSA standards. The module 1004 comprises the edge connector 1010, a main housing 1030 and a latching/delatching assembly 1032, which will be referred to as a latching assembly, for simplification purposes. The main housing 1030 may be formed of a metal or other die-cast materials or plastic or other suitable materials, and may house the module's PCB. The latching assembly 1032 includes receptacles 1034, 1036 for connecting the module to pluggable fiber connectors 1038 and 1040, respectively. The connectors 1038 and 1040 are shown by way of example only, as are the receptacle ends 1034,1036, which may be formed to receive optical fiber connectors for an optical transceiver in accordance with a small form factor pluggable standard, as discussed above. Two receptacle ends 1034, 1036 are shown, but the optical module 1004 may include more or fewer receptacle ends.

Figure 2:
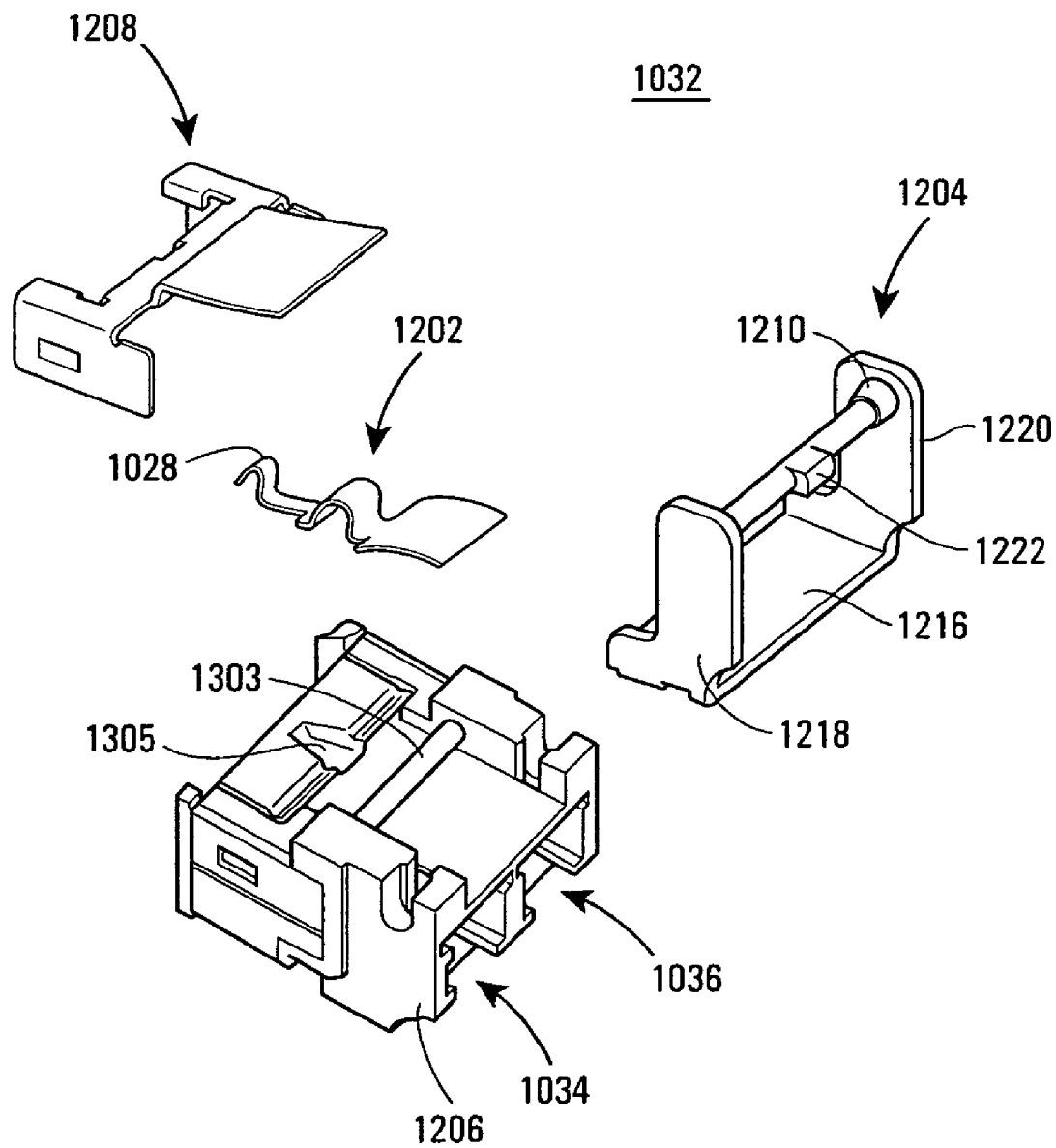
FIG. 2 illustrates an exploded view of an example latching assembly including a latching mechanism, actuator, and biasing apparatus.

FIG. 2 illustrates assembly 1032 of the optical module 1004 in an unassembled form, illustrating a latching/delatching mechanism 1202 and a rotatable actuator 1204, both mountable in a housing 1206. The assembly 1032 further includes a biasing apparatus 1208 also mountable to the housing 1206, in an example. The mechanism 1202 may be made of a metal, for example, out of sheet metal or by a die-cast or metal injection molding process. The biasing apparatus may bias the latching mechanism to its latching position, for example. In some configurations, the latching mechanism 1202 may be coupled to the housing 1206 by the biasing apparatus 1208, as discussed in further detail below. Various example biasing apparatus are described herein that may support a pivotable mating element and provide a spring force, against an actuator. As such, the biasing apparatus may also be a spring apparatus.

The actuator 1204 has a connector 1210 pluggable into receiving slots 1212 on the housing 1206, for rotational movement therein. In the illustrated example, two opposing receiving slots 1212 are shown. Furthermore, the receiving slots 1212 have a generally C-channel shape in the illustrated example and restrain the connector 1210 against non-axial movement via restraining ridges 1214 (see FIG. 5). The receiving slots 1212 may have a shape other than that shown, however, such as a closed loop receiving slots that may accept a spring-biased push-pin as the actuator connector 1210.

In addition to the connector 1210, the actuator 1204 further comprises a handle 1216 extending across support arms 1218 and 1220. The support arms 1218, 1220 and handle 1216 may be formed of an identical material, such as plastic formed in a molded or extruded form. Other materials may be used including sheet metal. The connector 1210 may be formed of similar materials. And any of these structures may be coated. The handle 1216 may be sized to allow easy removal of the optical module 1004 via a finger, for example.

As explained in further detail below, in operation the handle 1216 may be rotated about an axis defined by the receiving slots 1212, to move the optical module from a latching position to a delatching position. In the illustrated example, the connector 1210 includes a cam 1222 that is in a horizontal orientation during a latching position. Upon rotation of the actuator 1216 from a latching position (FIGS.

1 and 6A, for example) to the delatching position (FIG. 6B), the cam 1222 engages a camming surface of the latching mechanism 1202, to rotate latch 1028 about an axis to controllably latch and release the latch 1028 from the cage 1006.

Figure 3:
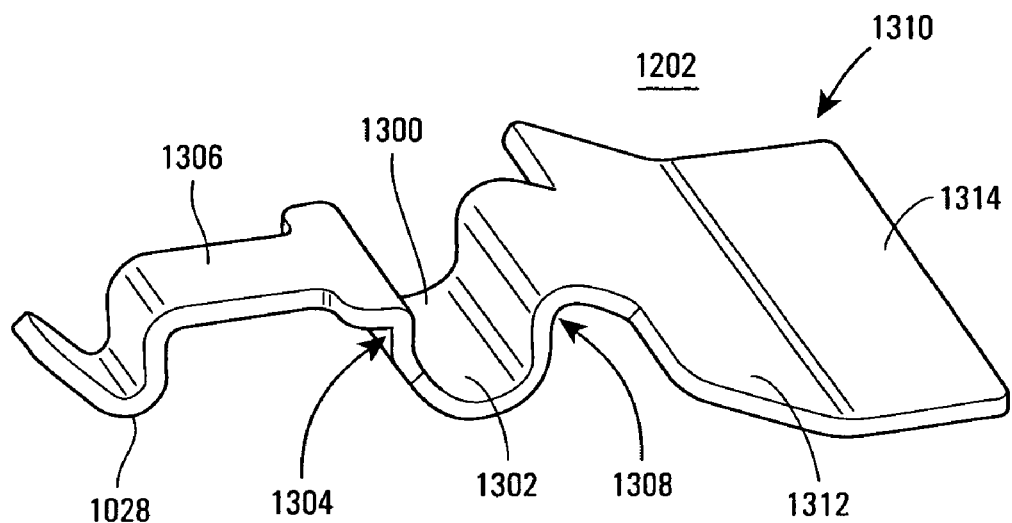
FIG. 3 illustrates an expanded view of the latching mechanism of FIG. 2, in accordance with an example.

To selectively latch and unlatch the optical module 1004 to the cage 1006, and in particular, to the latching recess 1026, the latching mechanism 1202 (FIG. 3) may include a slotted mating element 1300 formed of a tubular-shaped wall 1302 that is mountable to a pivot element 1303 on the housing 1206 (FIG. 2). The slotted mating element 1300 is shaped complementary to the pivot element 1303 for rotational movement relative thereto about a common axis. When the mechanism 1202 is positioned on the housing, the latch 1028 may rest in a latch chamber 1305 of the housing 1206 (FIG. 2).

The wall 1302 is coupled to a first generally L-shaped member 1304 that is coupled to latch 1028 via an extension arm 1306. The wall 1302 is also coupled to a second generally L-shaped member 1308 and a cam follower 1310, which may be formed of an articulated segment 1312 and an engaging segment 1314 defining an angle relative thereto. In the illustrated example, the shape of the cam follower 1310, the dimensions thereof, the orientation of the segments 1312 and 1314, and the angle therebetween may affect transfer of a camming force into a rotational force (e.g., from cam 1222 into a rotational force on the mating element 1300 to rotate it about the pivot element 1303).

Figure 4:
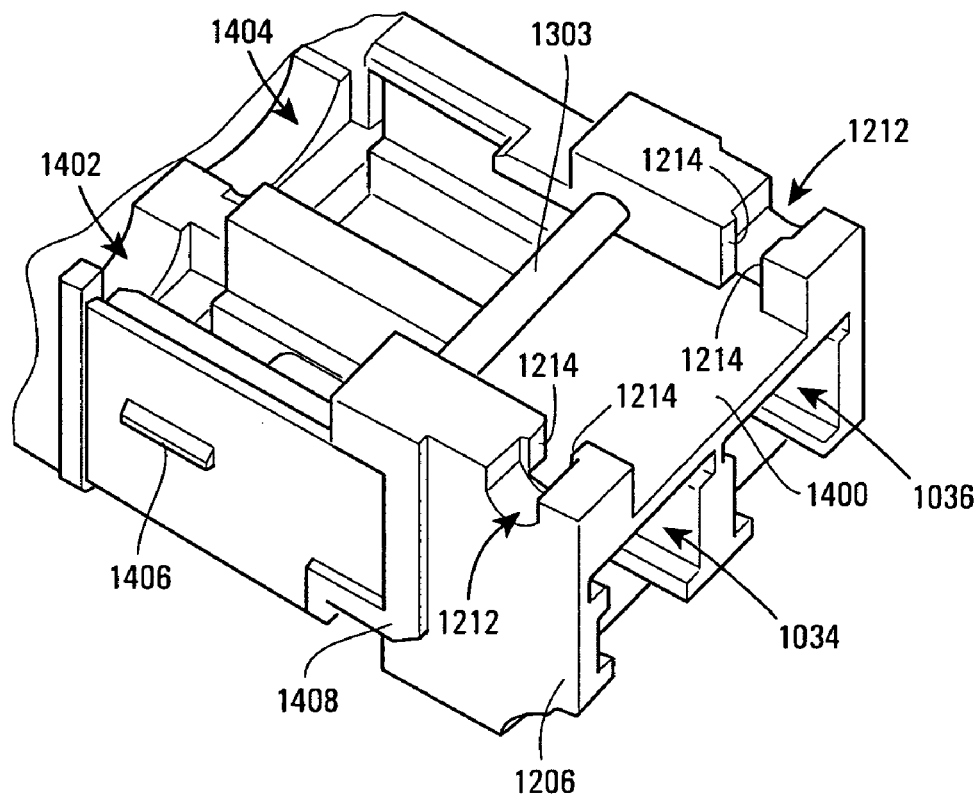
FIG. 4 illustrates an expanded view of the latching assembly housing of FIG. 2, in accordance with an example.

In an example assembled form, the mating element 1300 is disposed adjacent pivot element 1303 (FIG. 4), which may be generally tubular shape in shape, as shown. The pivot element 1303 is disposed at one end of a base 1400 disposed above the two receptacle ends 1034 and 1036. Each receptacle end 1034, 1036 may include an OSA mating feature, 1402 and 1404, respectively, for receiving a ferrule for a fiber-based connector. The features 1402 and 1404 are illustrated by way of example only.

The housing 1206 further includes opposing notches 1406 (only one shown) for locking with the biasing apparatus 1208. In the illustrated example, the housing 1206 also includes an optional wall feature 1408 (only one shown) that may align with rotatable actuator 1204 in a latching position. The wall feature 1408 may provide a structural stop for the actuator 1204 in a latching position, or the feature 1408 may align with the actuator 1204.

Figure 5:
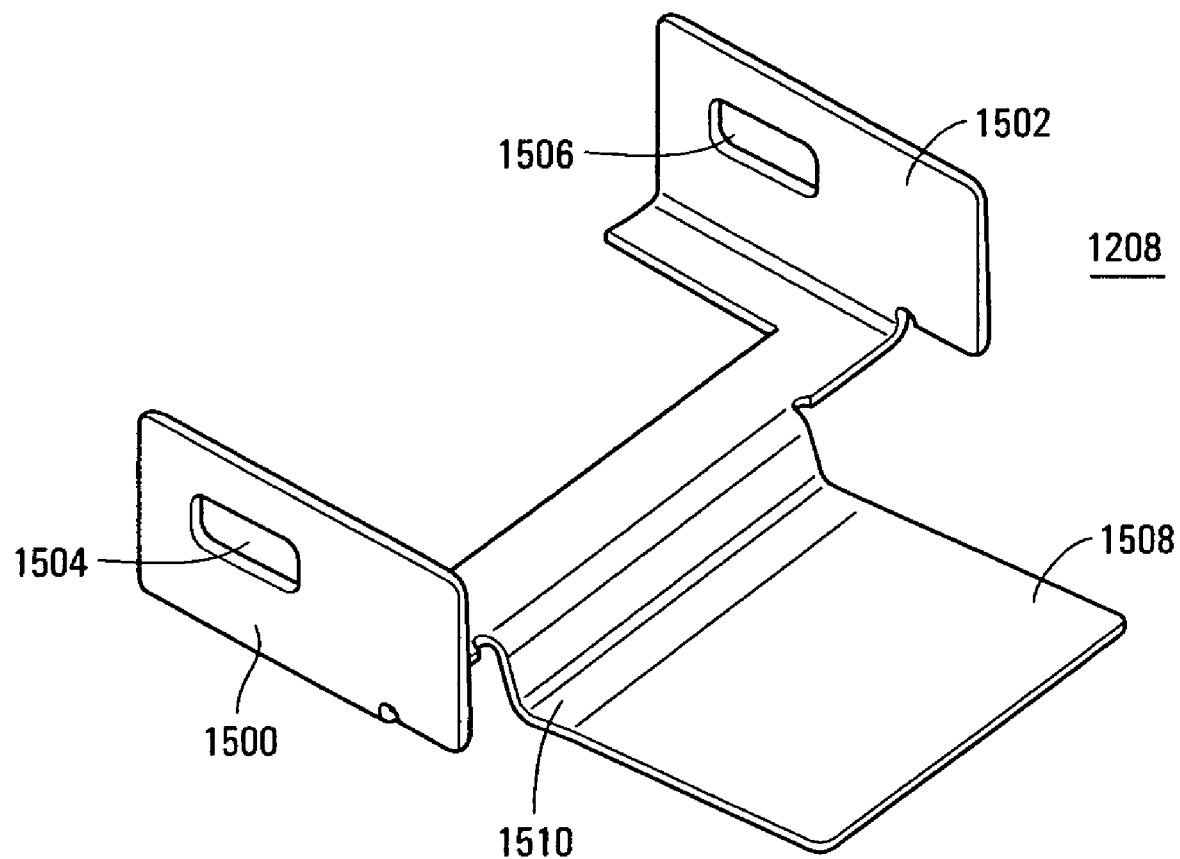
FIG. 5 illustrates an expanded view of the biasing apparatus of FIG. 2, in accordance with an example.

The latching mechanism 1202 may be held in place against the housing 1206 by the biasing apparatus 1208, illustrated in more detail in FIG. 5. The biasing apparatus 1208 includes a pair of opposing flanges 1500 and 1502, each defining a notching slot 1504 and 1506, respectively, for engaging and locking on the notches 1406, for example, after the slotted mating element 1300 is aligned with the pivot element 1303. In the illustrated example, the biasing apparatus 1208 has a support member 1508 disposed to bias the latching mechanism 1202 into its latching position, i.e., with the latch 1028 extended. The support member 1508 may be a leaf spring, for example. In the illustrated example, the member 1508 is angled with respect to a support 1510, and resistance to deflection from this angle provides latch biasing. The member 1508 may alternatively be coplanar with the support 1510. In an alternative example, the biasing apparatus 1208 may include retaining members such as those shown in FIG. 8.

The support member 1508 may bias the latching mechanism by engaging the mating element 1300. In some examples, the support member 1508 may ensure engagement between the mating element 1300 and the pivot element 1303 by applying a force against an outer surface of the mating element 1300. In other examples, the mating element 1300 may be formed to self-engage the pivot element, such as via snap fitting. And, in such cases, the member 1508 may add further protection against disengagement of the two. Other example configurations for spring apparatuses are contemplated.

Figure 6A:
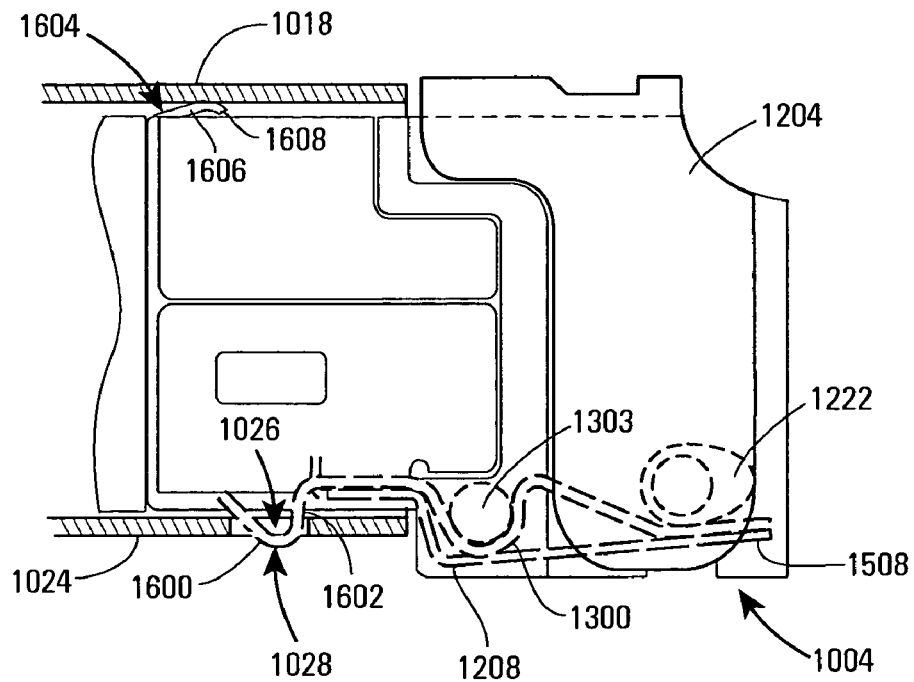
FIG. 6A illustrates a partial side-view of a latching position of the latch assembly of FIG. 2 with some features shown in dashed line, in accordance with an example.
Figure 6B:
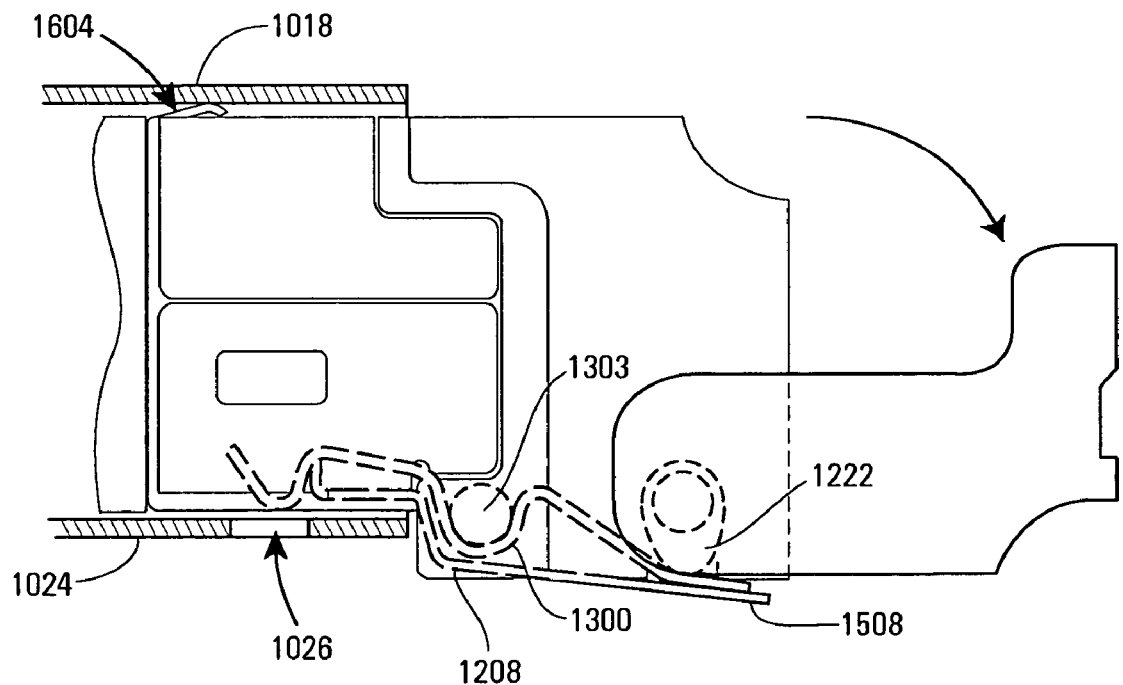
FIG. 6B is a similar illustration to FIG. 6A, but with the latch assembly in a delatching position.

FIGS. 6A and 6B show example operation of the rotatable latch 1204 in selectively latching and delatching the optical module 1004 to the cage 1006. FIG. 6A shows a latching position, where the actuator 1204 is closed on the housing 1206 adjacent the wall 1408. The optical module 1004 is latched in the cage 1006 with the latch 1028 restrained within the latch recess 1026. In the illustrated example, the latch 1028 includes an articulated entrance face 1600 that is able to engage the wall of the cage during insertion so that the latch 1028 can deflect into the chamber 1305 allowing the optical module 1004 to plug unobstructed into the cage 1006. The latch 1028 may be moved to a partially-retracted position into the chamber 1305 by engaging a cage or other obstruction during module insertion. The latch 1028 further includes a substantially right-angled face 1602 that resists a pulling force (i.e., to the right in the illustration) to retract the optical module 1004 out of the latching position. Other shapes and configurations for the latch 1028 may be used, including a C-shaped handle rotatable about an edge of the latch opening 1026, as well as structures having curved or linear entrance and exit faces.

The optical module 1004 also includes a retainer spring 1604 formed of a first sloped face 1606 and a second sloped face 1608 meeting at an apex 1610. The spring 1604 is deflectable to engage an undersurface of the wall 1018. The spring 1604 may apply an outward force on the cage 1006, which in turn would apply an opposing inward force that is transferred through the optical module 1004 to ensure maximum extent of the latch 1028 through the latch recess 1026.

In FIG. 6B, a force (e.g., via an operator's finger) has rotated the actuator 1204, pulling the actuator 1204 approximately 90°. This deflection angle is by way of example; an actuator may be used to delatch at other angles. Rotation of the actuator 1204 causes the cam 1222 to rotate from a horizontal position (FIG. 6A) to a vertical position (FIG. 6B), in the illustrated example. Other latching and delatching orientations may be used. Furthermore, the cam 1222 may have different dimensions to affect greater deflection. Also the cam 1222 may extend along a longer length of the connector 1210 to provide a greater engaging surface area between the cam and cam follower.

In the illustrated example, the cam 1222 deflects at least a portion of the cam follower 1310 of the latching mechanism 1202, which in turn rotates the mating element 1300 about the pivot element 1303, for example, about a common axis of the two. This rotation retracts the latch 1028 into the housing 1206, e.g., into the latch chamber 1305, thereby placing the optical module 1004 in a delatched position from which it may be separately removed from the cage 1006. The latch 1028 is in a fully retracted position that may allow free movement of an optical module from a cage.

The mating element 1300 maintains contact with the pivot element 1303 during latching and delatching via friction (e.g., the two if one snapped together) and/or via a biasing force applied by the biasing apparatus 1208 against the mating element 1300. In the illustrated example, this biasing force is achieved by engagement of the support 1510 of the biasing apparatus 1208, although alternatively the biasing can be due to engagement with the member 1508. The member 1508, engaged against the follower 1310 in the illustrated example, may deflect under the camming force of the cam 1222, which is greater than the spring force of the member 1508. The member 1508, which may be formed of a resilient material, such as metal, may provide a spring force that opposes this camming force, such that upon rotation of the actuator 1204 back to the latching position, the spring force of the member 1508 biases the cam follower 1310 back to the position of the FIG. 6A, thereby rotating the mating element 1300 (counter-clockwise) around the pivot element 1303 and releasing the latch 1028 from the chamber 1305 and into a locking (i.e., latching) position with the latch recess 1026. The follower 1314 may be formed of a resilient material or resilient configuration (such as a spring connection between the support and contact member) to bias the latch 1028 into its latching position (FIG. 6A). By biasing the mating element 1300 against the pivot element 1303, the biasing apparatus 1208 may ensure continuous contact between the two during latching and delatching.

Figure 7:
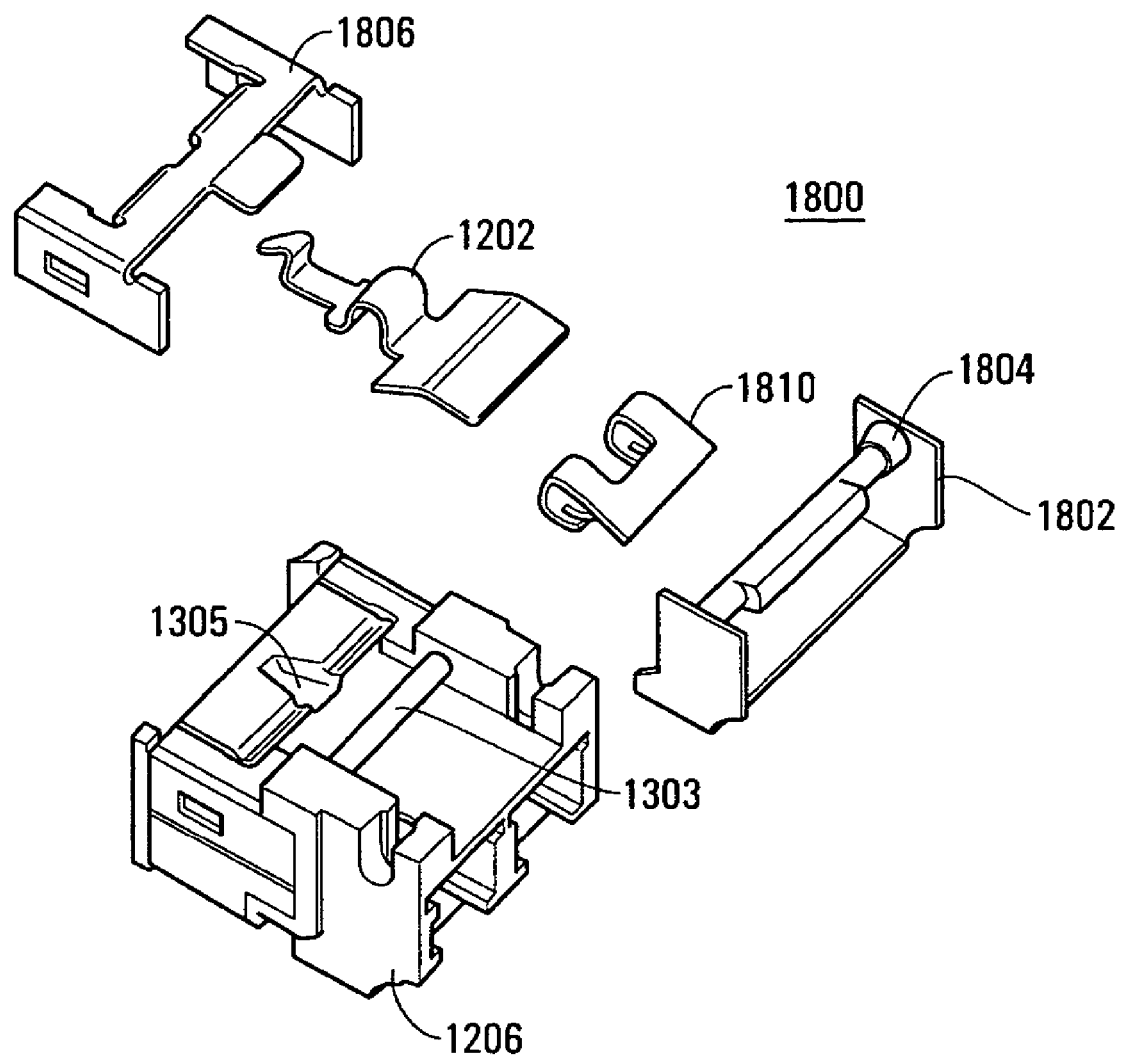
FIG. 7 illustrates an exploded view of a latching assembly in accordance with another example.

Numerous alternative example implementations are contemplated. FIG. 7 illustrates an example optical module sub-assembly 1800, having similar features to those described above for the apparatus 1032. For explanatory purposes, like reference numerals will be used.

The assembly 1800 is similar to the latching assembly 1032. A rotatable actuator 1802 similar to actuator 1204 includes a rotatable connector 1804 that may be engaged or coupled with the receiving slots 1212 of the housing 1206. The latching mechanism 1202 is mountable on the housing 1206, as described above. In the illustrated example, the assembly 1800 differs from assembly 1032 in that the biasing apparatus 1208 has been replaced by a two-part assembly biasing apparatus including a support apparatus 1806 and a spring apparatus 1810 that may be independently mounted to a housing for independent movement. It is noted that the support apparatus 1806 may also provide a spring force, in some examples.

Figure 8:
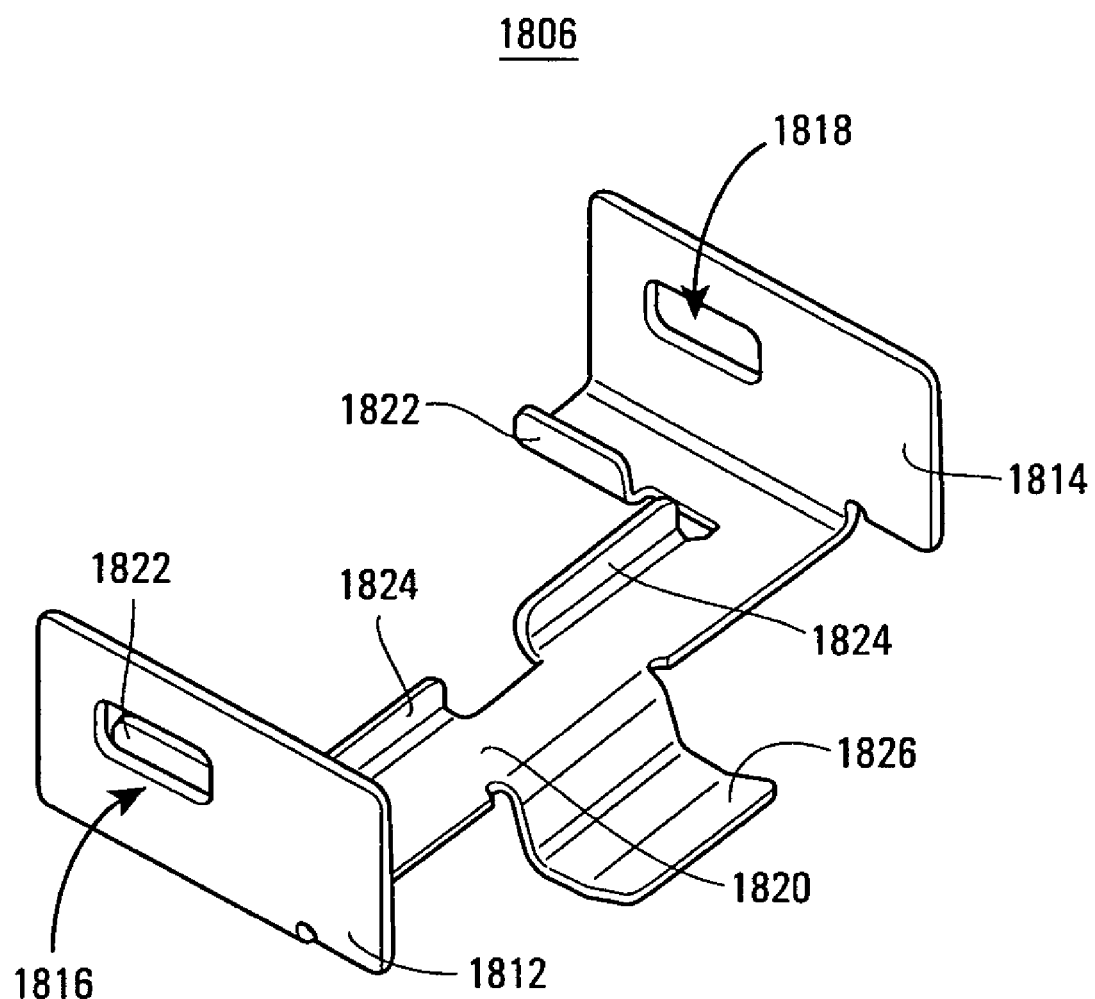
FIG. 8 illustrates an expanded view of a biasing apparatus of the latch assembly of FIG. 7, in accordance with an example.

As illustrated in an expanded view in FIG. 8, the apparatus 1806 includes two opposing flanges 1812 and 1814 having notches 1816 and 1818, respectively. In the illustrated example, a support 1820 spans between the two flanges 1812 and 1814 and includes retaining members 1822 and 1824 that may be interlocked with corresponding receiving slots (not shown) within the housing 1206 to assist in retention of the spring apparatus 1806.

The support apparatus 1806 includes a support member 1826 that is shorter in length than the support member 1508 and extends from the support 1820. The member 1826 extends a sufficient distance to engage the mating element 1300 for coupling the mating element 1300 to the pivot element 1303 or for biasing the mating element 1300 against the same, depending on the engagement between the two. The member 1826, in the illustrated example, does not extend a sufficient distance to also engage and bias the cam follower 1310.

Figure 9:
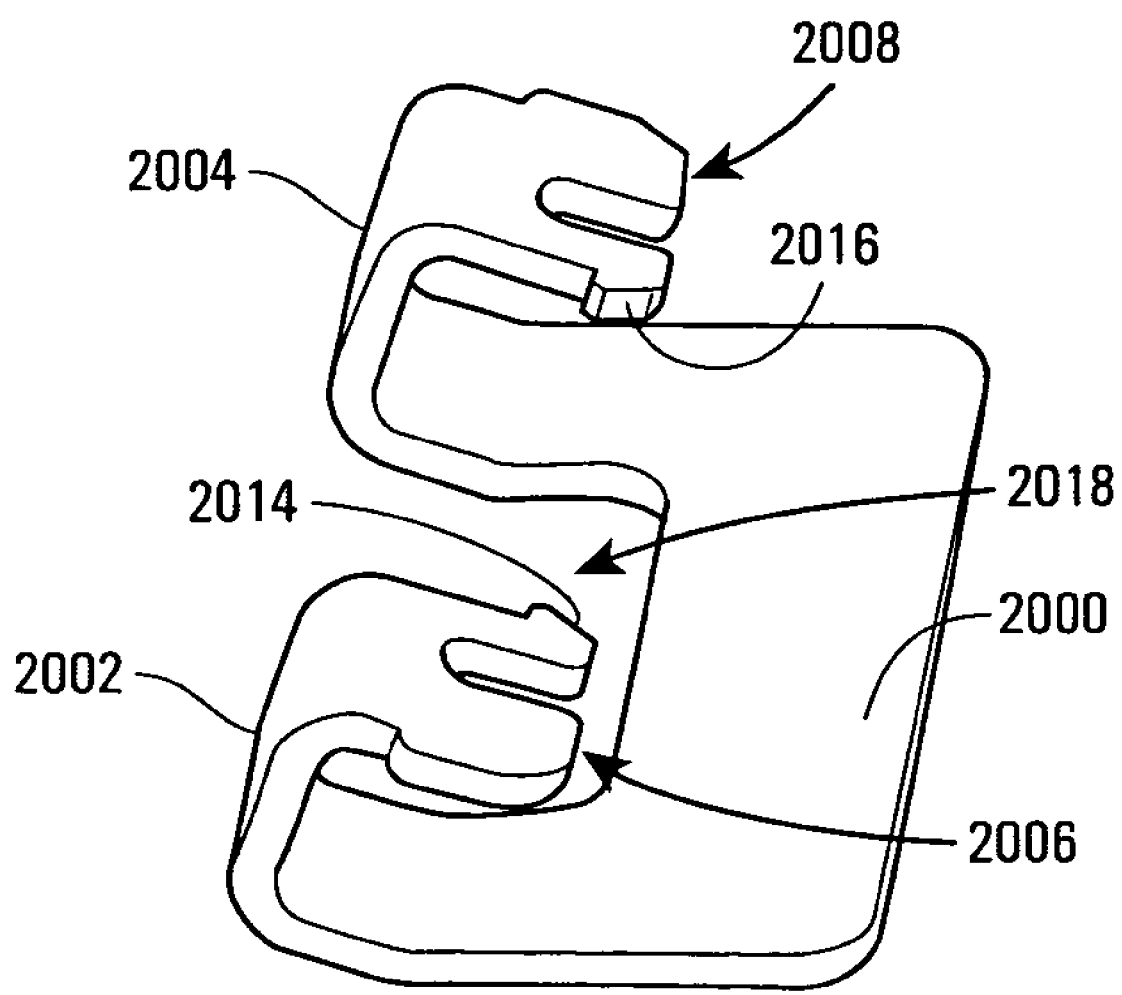
FIG. 9 illustrates an expanded view of another biasing apparatus of the latch assembly of FIG. 7, in accordance with an example.
Figure 10:
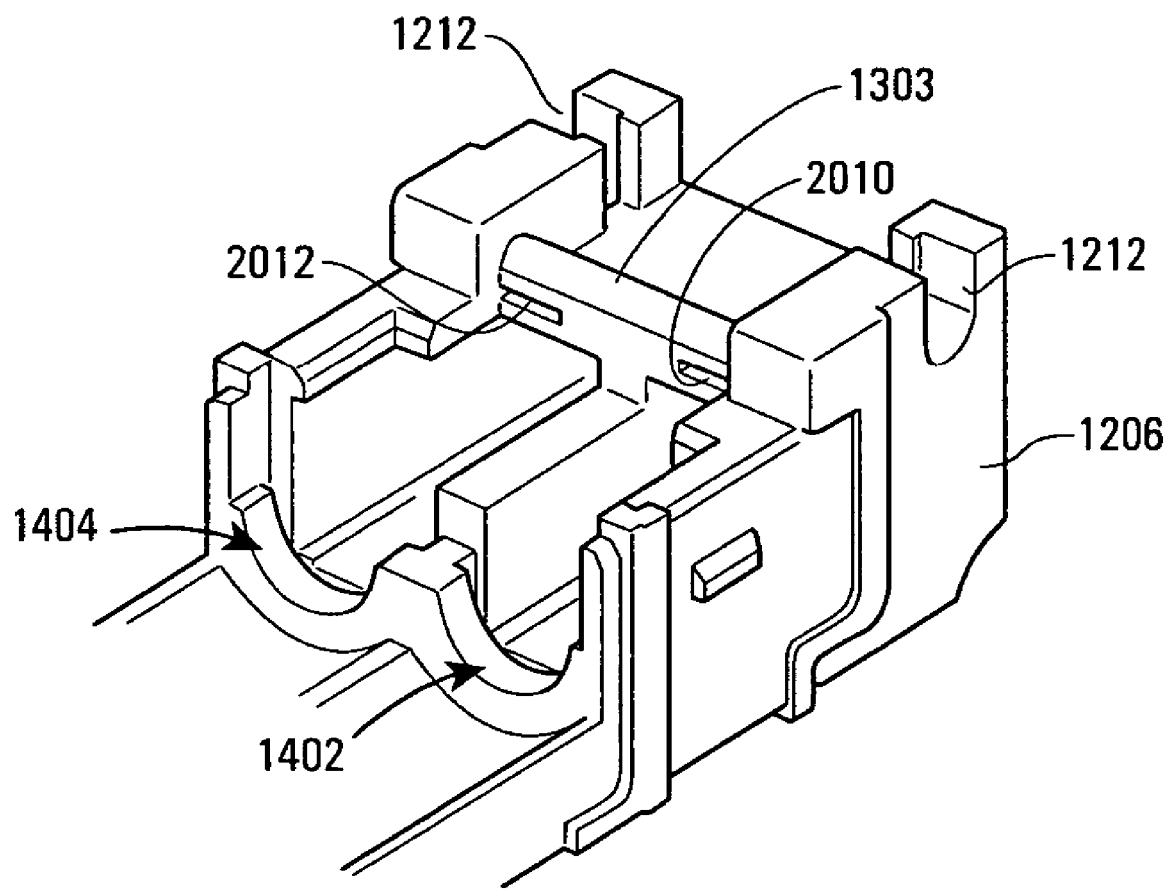
FIG. 10 illustrates a latching assembly housing, in accordance with an example.

Separately, the spring apparatus 1810 (FIG. 9) is used to bias the latching mechanism 1202 to the latching position. The spring apparatus 1810 includes a leaf spring, support member 2000, in cantilever configuration, that extends from two C-shaped mounting 2002 and 2004. The mounting arms 2002 and 2004 each have pinchable clasps 2006 and 2008, respectively, that may be guided into a locking engagement with slots 2010 and 2012, respectively, in the housing 1206, as shown in FIG. 10. The slots 2010 and 2012 may extend between a bottom portion of the pivot element 1303 and the base 1400. The clasps 2006 and 2008 having retaining nubs 2014 and 2016, respectively, that may prevent the spring apparatus 1810 from releasing from the housing 1206. In some examples, the spring apparatus 1810 may define an opening 2018 within which the support 1826 can rest when assembled with the housing.

Figure 11A:
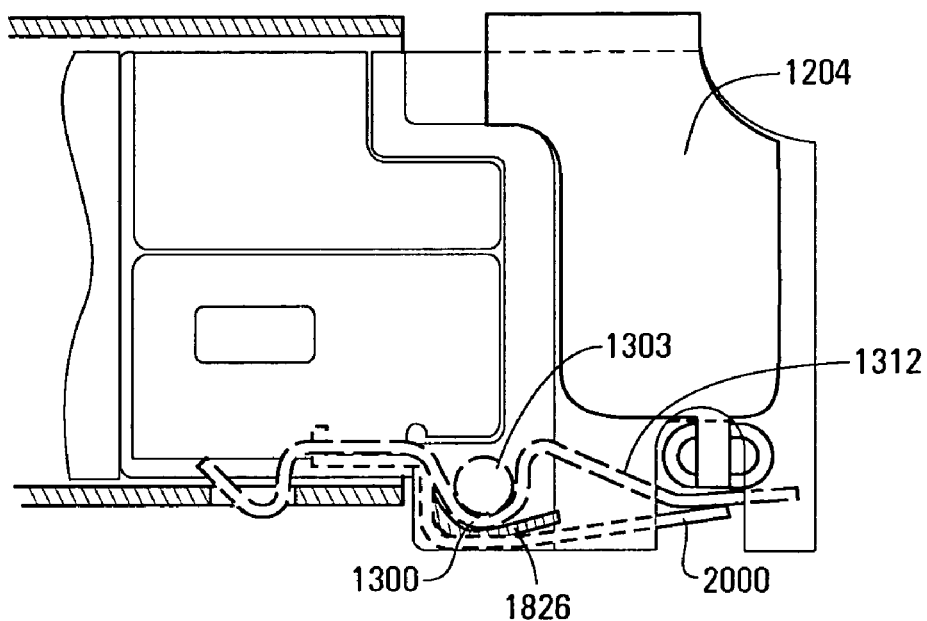
FIG. 11A illustrates a partial side-view of a latching position of the latch assembly of FIG. 7 with some features shown in dashed line, in accordance with an example.
Figure 11B:
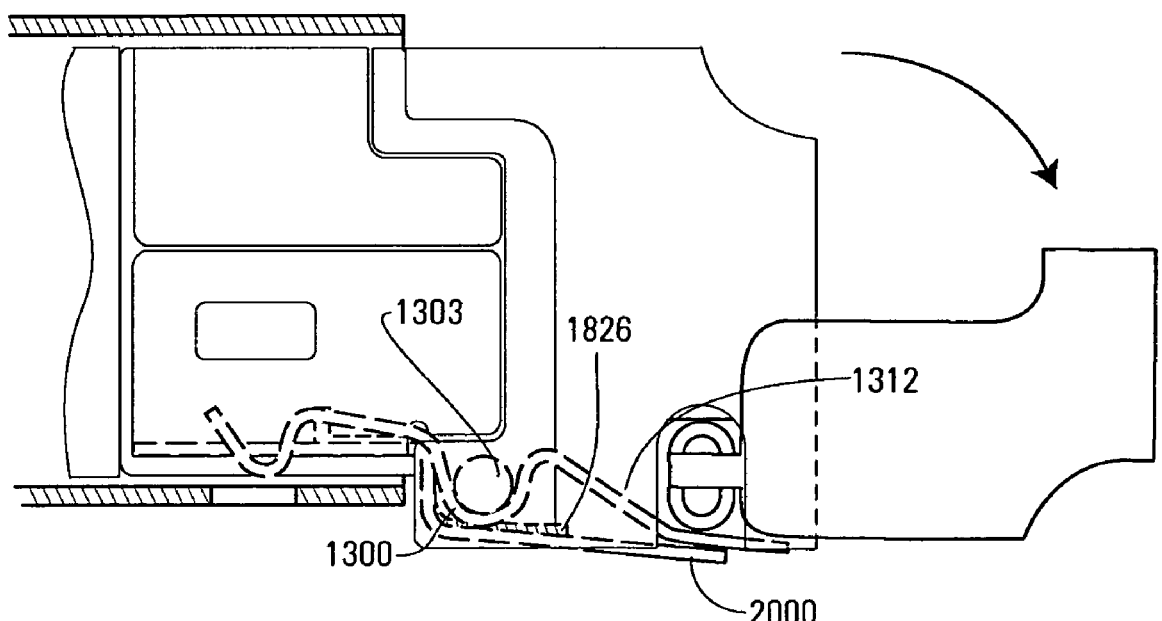
FIG. 11B is a similar illustration to FIG. 11A, but with the latch assembly in a delatching position.

FIGS. 11A and 11B illustrate the optical module 1800 in a latching position and delatching position, respectively. The operation is similar to that described above in reference to FIGS. 6A and 6B, and as such, some operational details will not be recounted. These figures show, however, that the member 1826 engages the mating element 1300, while the leaf spring 2000 engages the segment 1312, biasing the cam follower 1314 upwards at least in the delatching position of FIG. 11B. In an example, the leaf spring 2000 may bias the segment 1312 into engagement with the connector 1210, and/or cam 1222, at the latching position, as well.

As shown in FIG. 11B, upon rotation of the actuator 1204, the cam 1222 engages the cam follower 1310 deflecting the member 1314, causing the leaf spring 2000 to deflect, causing the mating element 1300 to rotate about the pivot element 1303, and thereby raising the latch 1028 into a latching position. In this latching position, the leaf spring 2000 maintains engagement with the latching mechanism 1202. The mating element 1300 is supported by the support member 1826 to maintain engagement of the mating element 1300 and the pivot element 1303. But this support may be independent of the biasing force from the leaf spring 2000, which is separately supported by the housing 1206 through slots 2010 and 2012.

Figure 12:
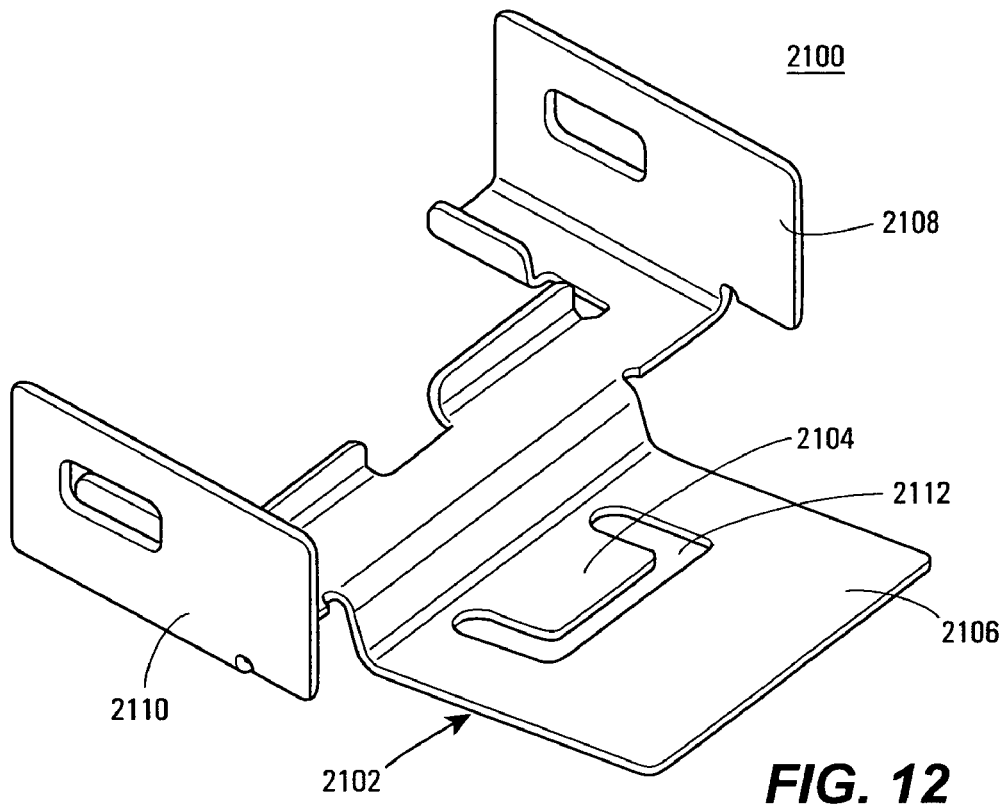
FIG. 12 illustrates a biasing apparatus in accordance with another example, the biasing apparatus having two members moveable relative to one another.
Figure 13:
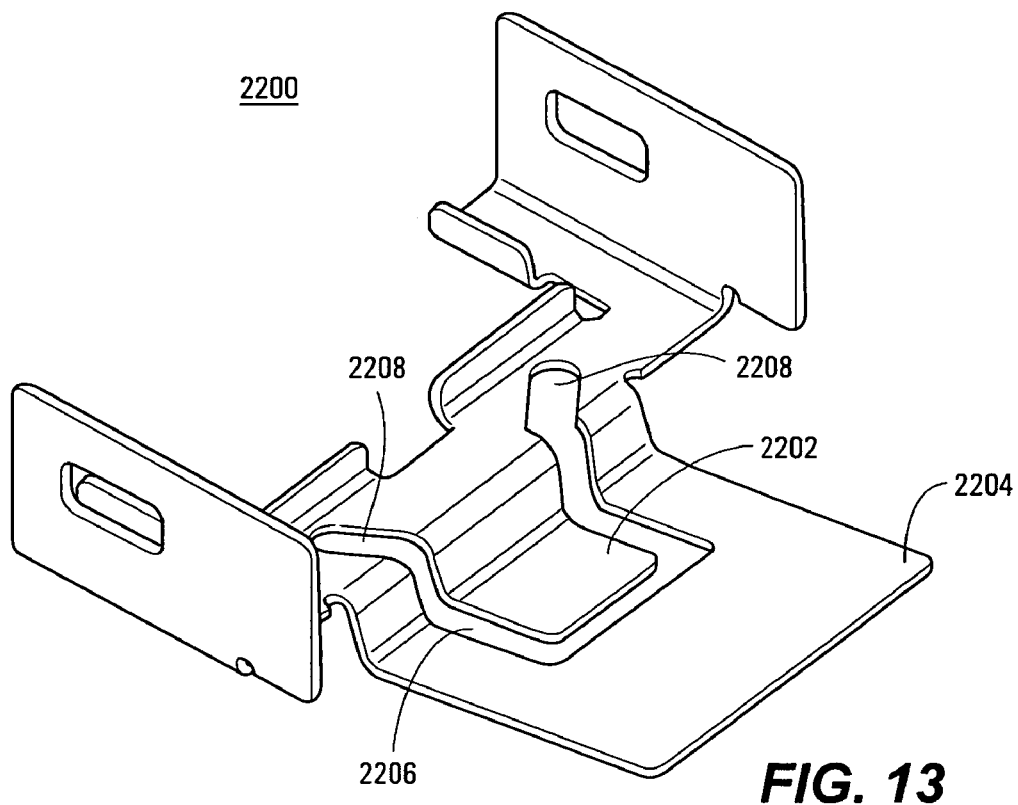
FIG. 13 illustrates another example biasing apparatus.

As further alternative examples, FIGS. 12 and 13 depict springs that may be used in lieu of the biasing apparatus 1208 of FIG. 2 and in lieu of the two-piece biasing apparatus (i.e., elements 1806 and spring 1810) of FIG. 7. Biasing apparatus 2100 (FIG. 12) includes a cantilever arm 2102 having a support member 2104 disposed to engage a mating element to a pivot element and a support member 2106 disposed to bias a latching mechanism toward a latching position, for example, by engaging a cam follower. The biasing apparatus 2100 further includes opposing flanges 2108 and 2110 for mounting to a housing, similarly to descriptions provided above.

In operation, the biasing apparatus 2100 provides two support members that are moveable relative to one another and may thus be used to provide independent biasing or spring forces during operation. The member 2106 is movable relative to member 2104, such that the member 2106 may deflect under a force from the cam follower 1314 without affecting the supporting force of the member 2104 against the mating element 1300. The geometry of the member 2106, as well as the material composition thereof, may be set to establish an opposing spring force in the member 2106. In the illustrated example, the member 2106 is isolated from the member 2104 by a deflection gap 2112, having a C shape. The shape of the gap 2112 is illustrated by way of example and can take on other forms, but in the illustrated example the gap 2112 separates the member 2104 from the member 2106 to allow relative movement between the two. The amount of relative movement between members in the biasing apparatus 2100, as well as the amount of resisting force in each member may be adjusted through materials and/or geometries.

Figure 14A:
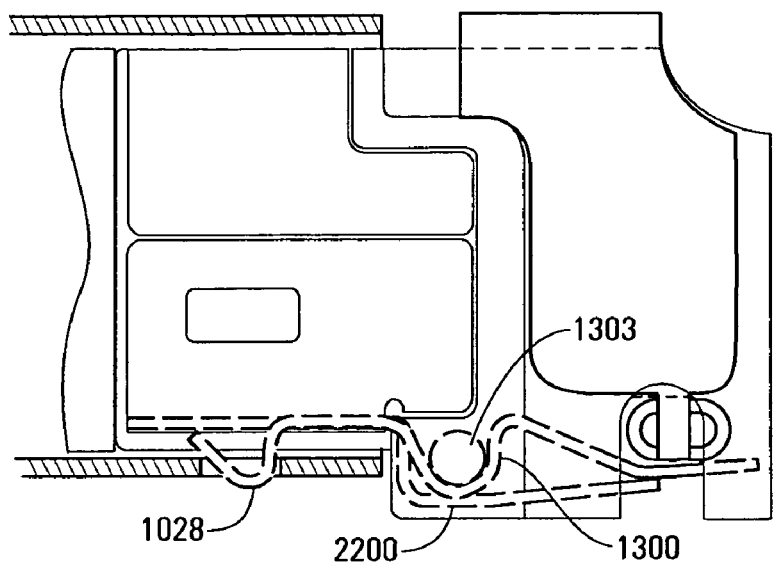
FIG. 14A illustrates a partial side-view of a latch assembly employing the biasing apparatus of FIG. 12 or 13 with some features shown in dashed line, in accordance with an example.
Figure 14B:
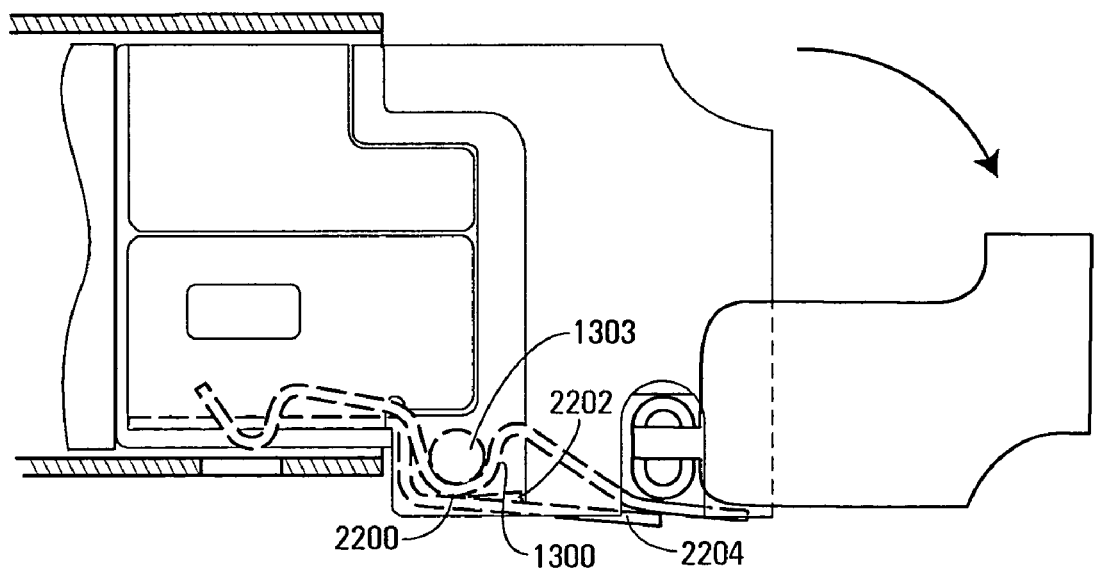
FIG. 14B is a similar illustration to FIG. 14A, but with the latch assembly in a delatching position.

FIG. 13 shows an example of another geometry that may be used. A biasing apparatus 2200 is similar to the biasing apparatus 2100, but may have a support member 2202 and support member 2204 separated by a deflection gap 2206 that has flared ends 2208. The flared ends 2208 may allow the member 2204 to experience great deflection under force, for example, from a cam follower, which may allow for less force to be applied to the actuator in moving an actuator from the latching position to the delatching position. The configuration may also reduce any strain placed on the support member 2202 during repeated latching and delatching. FIGS. 14A and 14B depict partial views of the latching and delatching positions for an optical module having the biasing apparatus 2200. Similar figures would illustrate latching and delatching positions for a module having the biasing apparatus 2100.

Figure 15:
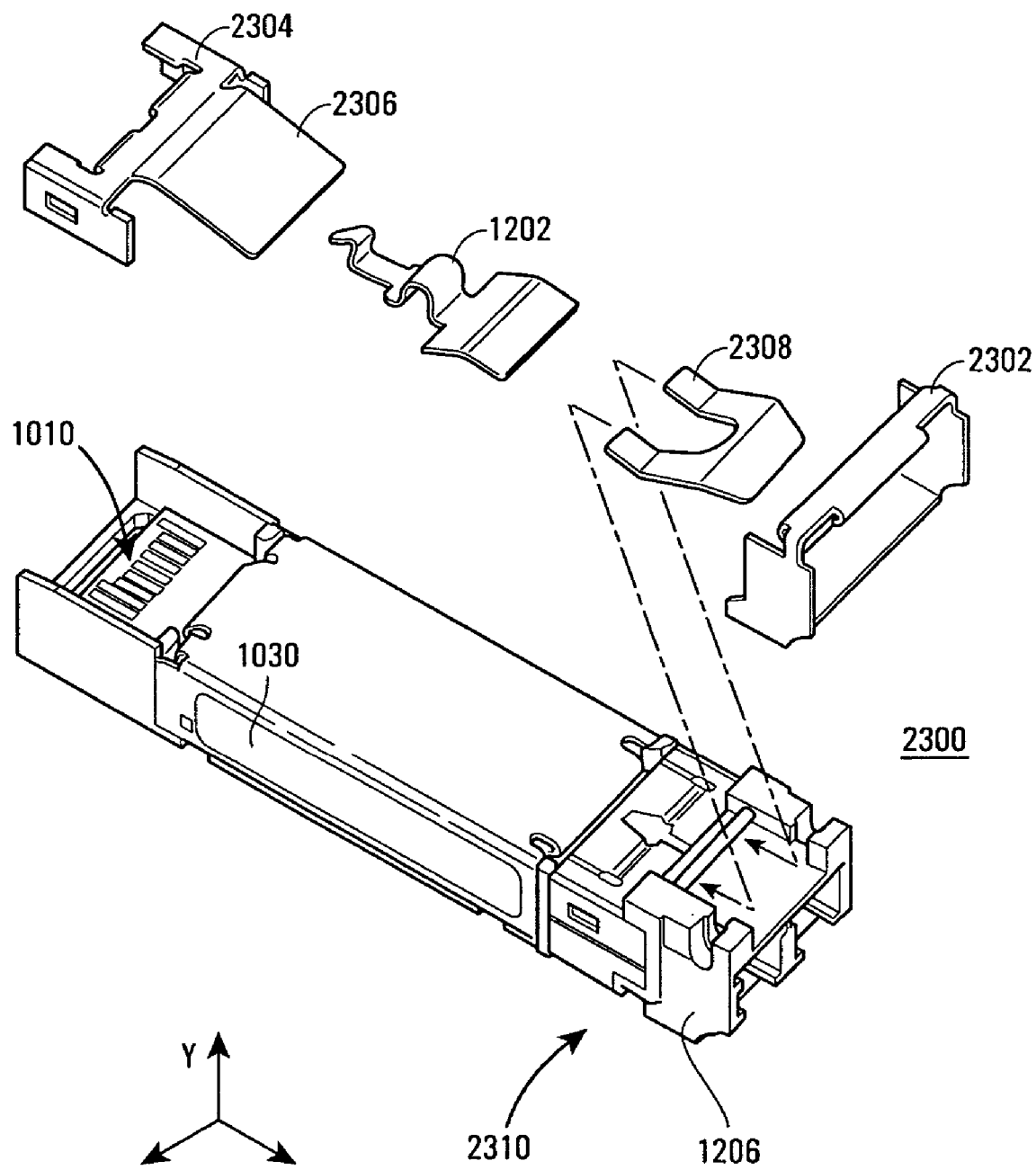
FIG. 15 illustrates another example optical module having a biasing apparatus that includes two separate spring members.
Figure 17A:
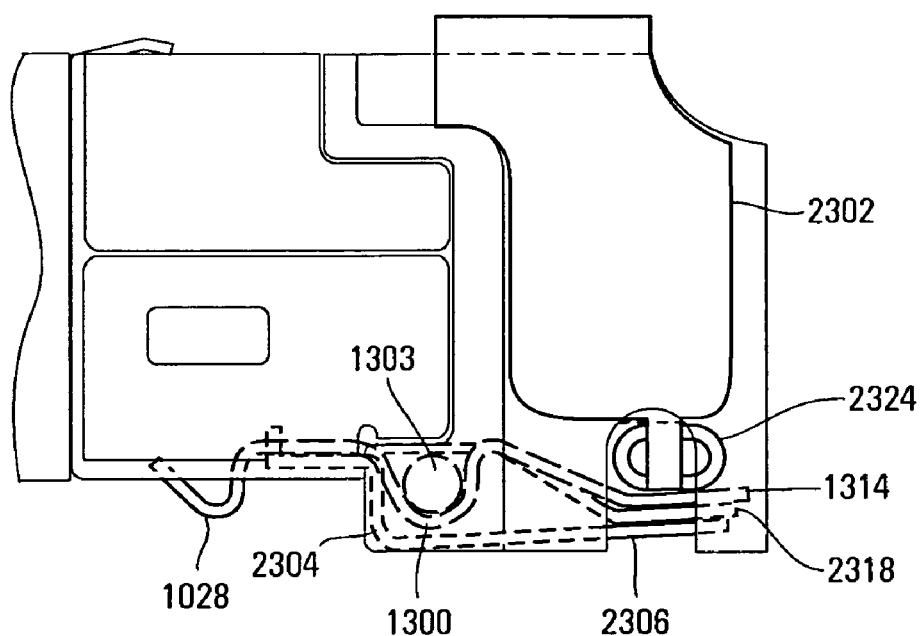
FIGS. 17A and 17B illustrate partial side views (latching and delatching positions, respectively) of an optical module using the biasing apparatus of FIG. 15.
Figure 17B:
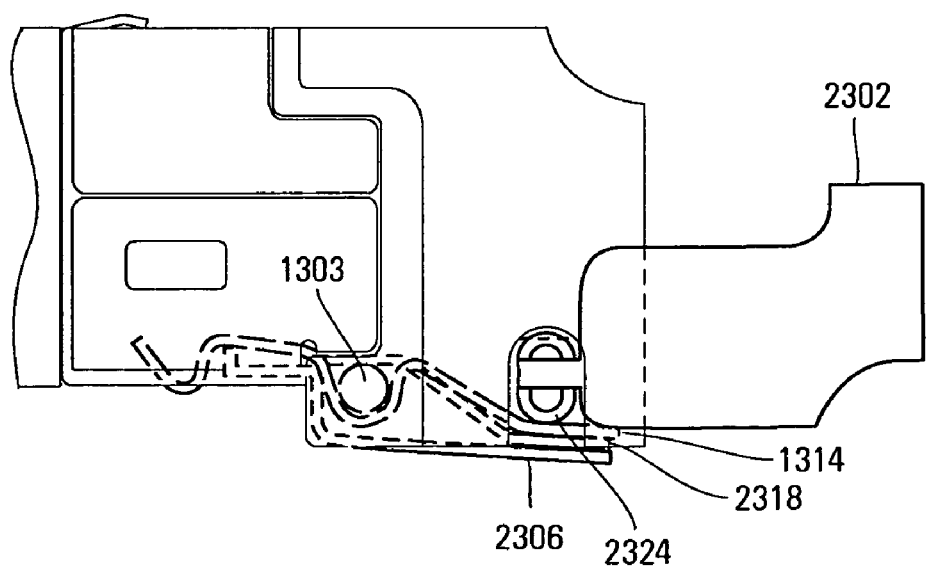

In some examples, a biasing apparatus contacts an outer surface of a mating element to bias a latching mechanism into engagement with a substantially-fixed pivoting element. In other examples, the latching mechanism may be biased into such engagement without contact to the outer surface of the mating element. FIG. 15 illustrates an example optical module 2300, which includes some structures similar to the optical module 1004 of FIG. 1, with like reference numerals used as a result. The latching mechanism 1202 and a rotatable actuator 2302, similar to actuators 1204 and 1802 described above, may be fitted onto the housing 1206, also as described above. Unlike module 1004, however, the module 2300 includes a first biasing apparatus 2304 that is similar to the biasing apparatus 1208, but that does not have a support engaging the slotted mating element 1300 into contact with the pivot element 1303. The biasing apparatus 2304 has a leaf spring 2306 that may operate as a spring bias against the cam follower 1310. As shown in FIGS. 17A and 17B, the leaf spring 2306 may be spaced from engagement with the outer surface of a mating element. The apparatus 2304 may be mountable to the housing 1206 via notches.

An additional biasing apparatus 2308 is separately mountable to the housing 1206. In an assembled example, the biasing apparatus 2308 biases the slotted mating element 1300 into contact with the tubular-shaped pivot element 1303 during rotation of the actuator 2302. The biasing apparatus 2308 may also provide a spring force that biases the cam follower 1310. Thus, in the illustrated example, two spring forces may be applied to bias latching assembly 2310 into its latching position, shown in FIG. 16A. The apparatuses 2308 and 2304 may be moveable relative to one another.

Figure 16:
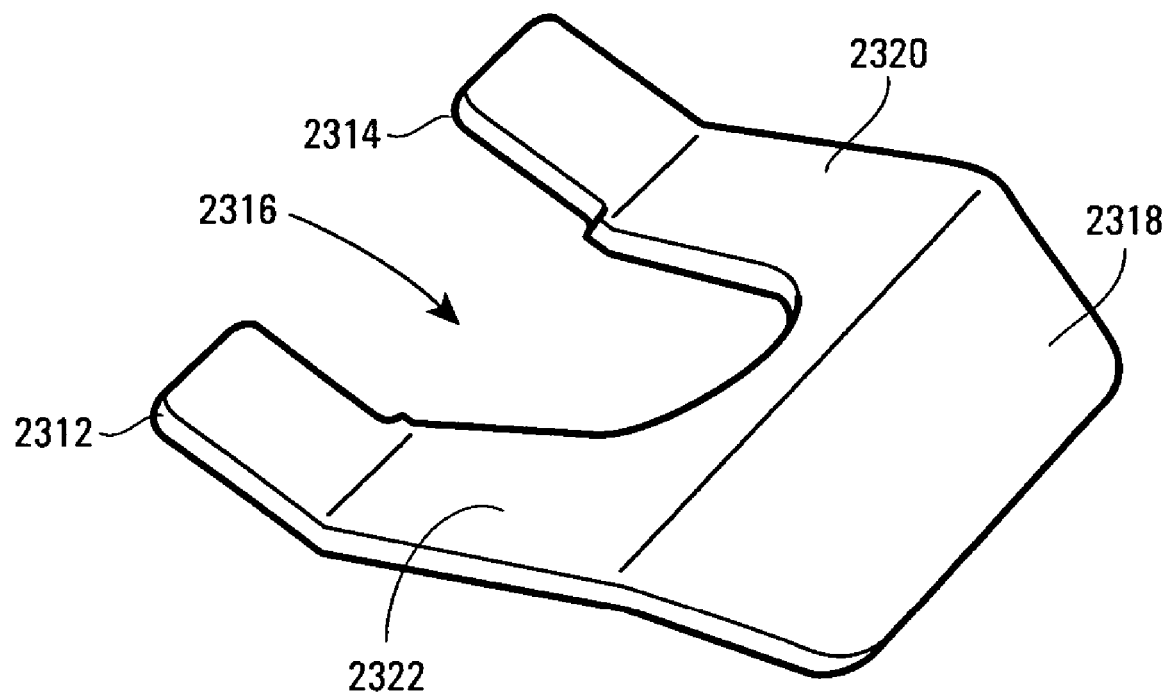
FIG. 16 illustrates one of the spring members of FIG. 15.

An example implementation of the biasing apparatus 2308 is shown in FIG. 16 and includes mounting sections 2312 and 2314, which may be mounted into the opposing ends (not shown) of the slots 2010 and 2012 (FIG. 10), respectively. The sections 2312 and 2314 are spaced apart by a receiving slot 2316 within which the slotted mating element 1300 may extend. A spring member 2318 extends from raisers 2320 and 2322.

FIG. 17A and 17B provide partial illustrations of two operating positions for the module 2300. FIG. 17A illustrates the module 2300 in a latching position with cam 2324 in a horizontal position, and the biasing apparatuses 2304 and 2308 in a non-deflected position. FIG. 17B illustrates the module 2300 in a delatching position after the cam 2324 has rotated a sufficient amount to produce a camming force that overcomes the spring bias of apparatus 2304 and 2308 to deflect them. In the illustrated example, the cam follower 1310 is disposed in engagement with the cam 1222 and the biasing apparatus 2308 is disposed between the cam follower 1310 and the spring leaf 2306 to bias the slotted mating element 1300 into contact with the pivot element 1303 during operation. Thus, biasing between a mating element and a pivot element may be achieved by biasing against portions of a latching mechanism, other than the mating element, such as a portion of its cam follower.

The optical modules herein may be used in numerous applications, such as optical transceivers used in Fibre Channel storage systems. The transceivers may support the 4-Gbps Fibre Channel specification, as well as the 2-Gbps storage-area devices and applications, for example. The transceivers may be used in embedded storage switches more generally. For example, the transceivers may be used in host bus adaptors (HBA), switches and redundant-array-of-independent-disks (RAID) modules that provide high-speed optical connections. The modules may offer hot-plug capability that enables flexible installation into a MSA or other cage during manufacturing and in the field operation. Merely by way of example, the transceivers may be 850 nm multimode optical fiber transceivers. Other communication wavelengths, for example, others in the infrared and near infrared, may be used instead. These environments of use are by way of example, as the modules may be used in any number of systems that may benefit from latching and delatching. Other example environments are provided above and include Fast Ethernet and Gigabit Ethernet.

Although certain apparatus constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalence.

What is claimed is:

1. An apparatus for releasably latching an optical module and a cage having a base and a latch opening disposed in the base, the apparatus comprising:
    a housing having a pivot element and at least one receiving slot aligned along an axis;
    a rotatable actuator having a connector disposed within the at least one receiving slot for movement about the axis, the connector having a cam rotatable between a first position and a second position;
    a latching mechanism movable between a latching position and a delatching position, the latching mechanism comprising a slotted mating element for coupling to the pivot element for rotational movement relative thereto, a latch movable in response to rotational movement of the slotted mating element, and a cam follower; and
    a biasing apparatus disposed to bias the latching mechanism to the latching position.

2. The apparatus of claim 1, wherein biasing apparatus has a first support member and a second support member.

3. The apparatus of claim 2, wherein the first support member and the second support member are moveable relative to one another.

4. The apparatus of claim 3, wherein the first support member and the second support member are on a cantilever arm and are at least partially spaced apart from one another.

5. The apparatus of claim 2, wherein the first support member and the second support member are independently mountable to the housing.

6. The apparatus of claim 2, wherein the first support member biases the slotted mating element against the pivot element and the second support member biases the cam follower against the cam in the delatching position.

7. The apparatus of claim 1, wherein the cam follower is a resilient member and wherein the cam deflects the cam follower in the second position.

8. The apparatus of claim 7, wherein deflection of the cam follower rotates the latch into a retracted position within the housing.

9. The apparatus of claim 8, wherein the biasing apparatus comprises opposing flanges mountable on the housing.

10. The apparatus of claim 1, wherein the biasing apparatus engages the slotted mating element to bias the slotted mating element against the pivot element.

11. The apparatus of claim 10, wherein the biasing apparatus engages the cam follower to bias the cam follower against the cam in the delatching position.

12. The apparatus of claim 1, wherein the biasing apparatus comprises a first spring member and a second spring member disposed between the cam follower and the first spring member, wherein the second spring member engages the cam follower to bias the slotted mating element into engagement with the pivot element.

13. The apparatus of claim 12, wherein the first spring member and the second spring member are separately mountable to the housing and movable relative to one another.

14. The apparatus of claim 1, wherein the biasing apparatus is a leaf spring.

15. The apparatus of claim 1, wherein the rotatable actuator is formed of a molded or extruded plastic.

16. A computer board assembly comprising:
an electronic computer board;
a cage mounted to the electronic computer board, the cage having a base and a latch recess disposed in the base;
an optical module selectively latchable with the cage, the optical module comprising,
a pivot element,
at least one receiving slot aligned with an axis,
a rotatable actuator having a connector disposed within the at least one receiving slot for movement about the axis,
a cam rotatable between a first position and a second position, in response to movement of the connector,
a latching mechanism movable between a latching position and a delatching position, the latching mechanism comprising a slotted mating element for coupling to the pivot element for rotation movement relative thereto, a latch movable in response to movement of the slotted mating element, and a cam follower, and
a biasing apparatus disposed to bias the latching mechanism to the latching position.

17. The computer board assembly of claim 16, wherein biasing apparatus has a first support member and a second support member.

18. The computer board assembly of claim 17, wherein the first support member biases the slotted mating element against the pivot element and the second support member biases the cam follower against the cam in at least one of the first position and the second position.

19. The computer board assembly of claim 17, wherein the first support member and the second support member are moveable relative to one another.

20. The computer board assembly of claim 17, wherein the first support member and the second support member are independently mountable to a housing of the optical module.

21. The computer board assembly of claim 16, further comprising at least one small-form factor receptacle at an end of the optical module.

22. The computer board assembly of claim 16, wherein the optical module is an optical transceiver.

23. The computer board assembly of claim 16, wherein the biasing apparatus is disposed to bias the mating element against the pivot element.

24. The computer board assembly of claim 16, wherein the biasing apparatus is disposed to bias the cam follower against the cam in the delatching position.

25. A method of selectively latching and delatching an optical module from a cage having a latch recess, the method comprising:
coupling a slotted mating element of a latching apparatus to a tubular-shaped pivot element of a housing, the slotted mating element being coupled to a latch extendible into the latch recess;
biasing the slotted mating element into contact with the pivot element for rotational movement of the slotted mating element about an axis of the pivot element; and
manually actuating an actuator from a first position to a second position, wherein the latching apparatus is in a latching position when the actuator is in the first position and a delatching position when the actuator is in the second position.

26. The method of claim 25, the method comprising:
in response to manually actuating the actuator, rotating a cam from a first position to a second position;
disposing a cam follower for movement in response to the cam.

27. The method of claim 26, the method comprising:
mounting a biasing apparatus to the housing, the biasing apparatus having a first support member biasing the slotted mating element into contact with the pivot element and a second support member biasing the cam follower into engagement with the cam.

28. The method of claim 27, wherein at least the second support member is moveable relative to the first support member.

29. The method of claim 27, wherein the first support member and the second support member are separately mountable to the housing and movable relative to one another.

* * * * *